United States Patent

[11] 3,631,401

[72] Inventor Saul B. Dinman
Wayland, Mass.
[21] Appl. No. 845,760
[22] Filed July 29, 1969
[45] Patented Dec. 28, 1971
[73] Assignee GRI Computer Corporation
Newton, Mass.

[54] DIRECT FUNCTION DATA PROCESSOR
10 Claims, 3 Drawing Figs.

[52] U.S. Cl. .......... 340/172.5
[51] Int. Cl. .......... G06f 3/00
[50] Field of Search .......... 340/172.5

[56] References Cited
UNITED STATES PATENTS

| | | | |
|---|---|---|---|
| 3,300,764 | 1/1967 | Doelz et al. | 340/172.5 |
| 3,302,183 | 1/1967 | Bennett et al. | 340/172.5 |
| 3,309,679 | 3/1967 | Weisbecker | 340/172.5 |
| 3,370,274 | 2/1968 | Kettley et al. | 340/172.5 |
| 3,487,369 | 12/1969 | King et al. | 340/172.5 |

*Primary Examiner*—Gareth D. Shaw
*Assistant Examiner*—Paul R. Woods
*Attorney*—Schiller and Pandiscio

ABSTRACT: A direct function data-processing system employing a number of functional elements all connected to either an input or output data bus or both so as to function as a data source of a data user or both. The system also includes a data transmission link which serves to connect the two data buses so that data can flow only from a data source to a data processor either directly, or by being shifted left or right, or by having one bit added thereto, or by being complemented. A simple control circuit is used to control the operation of the transmission link.

SAUL DINMAN
INVENTOR

BY Schiller & Pandiscio
ATTORNEY

SAUL DINMAN
INVENTOR

BY Schiller & Pandiscio

ATTORNEY

DIRECT FUNCTION DATA PROCESSOR

This invention relates to digital data processing, and more particularly to means for controlling data processing in a system.

A system can be defined as an assemblage of elements joined for regular interaction or interdependence of functions. The system may vary from the simple harmonious interaction of two devices each performing a simple unit operation to a complex network of devices capable of providing decision making and memory functions, and of interacting with people or with physical processes. When the requirements of the system grow to this latter point so that a high degree of "intelligent" control is necessary, the systems designer often uses a general purpose digital computer to provide the intelligent control at a cost relatively low compared to a "hard-wired" approach.

Because general purpose computers are not intended to act as systems organizers, to adapt them for this purpose requires that much attention be paid to the problem of interfacing the input and output aspects of the computer with the system. Adapting a computer for a control function for which it was not designed results in arithmetically oriented hardware being used to provide the intercommunication and control of the system elements. Thus, these systems elements communicate with one another and the world outside the system only through the computer's arithmetic structure, although often the data need not be arithmetically processed. Often too, there is no functional relationship between the language or hardware of the computer and the devices of the system. Obviously, for many systems, the computer usage as a calculating device is therefore minimal and quite uneconomic.

To alleviate these problems, the tendency is to employ a skilled programmer capable of translating both the desired overall system performance and the connections of the system elements to each other and to the computer, into the language of the computer. This creates the new problem of training or obtaining such highly skilled programmers each time one wishes to alter the system.

It is therefore a principal object of the present invention to provide a general purpose system control means that does not depend upon or use a general purpose computer.

Another object of the present invention is to provide a controller for digital, direct function processing of data in a system, which controller is formed of simple hardware and simple software and is therefore easy to wire and program.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Generally, the present invention is embodied in a system for digitally processing data which may derive from data generators such as transducers or from data storage devices such as memories, all generally referred to as data sources, and which data is used by data processors such as arithmetic or control devices. It will be appreciated that data generators may also possess processing functions and vice versa. The system comprises a data transmission or destination bus for distributing data signals with the system from any functional device in the system which supplies data, and another data transmission or source bus for distributing data signals within the system to any functional device which requires that data be fed to it. The two data buses are connectable through a data transmission link so that data can flow only in the direction from a data source to a data processor in accordance with a selected one of a limited number of simple operand functions. The latter functions typically are short circuit or direct destination bus-to-source coupling which is essentially doing nothing to the data per se, "add a single bit to the data," "shift the data right one bit," "shift the data left one bit" and the like.

The system also includes a control signal bus for distributing control signals to and from all sources and processors connected to either or both of the data buses, and to the data transmission link for controlling the functioning of the latter. Lastly, the system includes program control means for providing the control signals to control the functional relationship of the processors and sources with respect to data flowing through the system. Thus each functional device such as data processors and the data sources to which the system applies, will have all of the data it needs supplied from the data source bus and the data needed by the system are supplied by the functional devices to the data destination bus. This confers great flexibility on the system inasmuch as data need not necessarily be processed through a central computer between each functional operation, as in the prior art.

Figure 1:
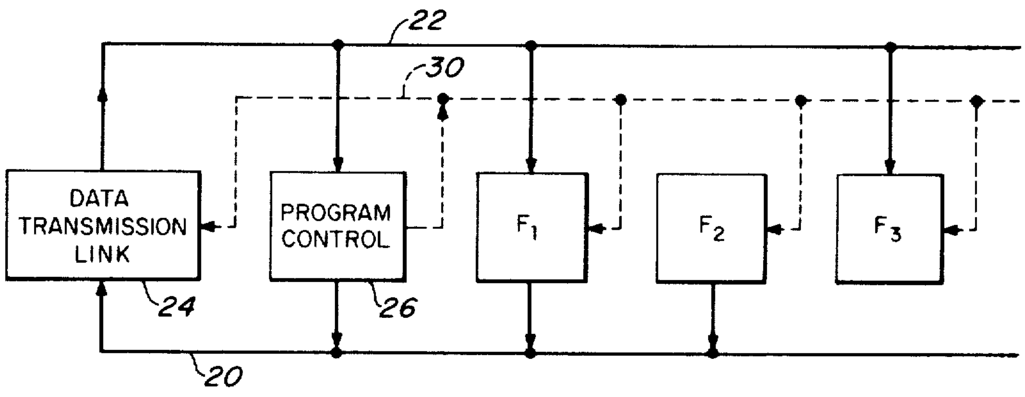
FIG. 1 is a block diagram showing one embodiment of the present invention.

Referring now to FIG. 1, the invention comprises a system for use with one or more data processors or data sources, all shown generally as functional blocks $F_1$, $F_2$, $F_3$ which are merely exemplary, the subscript numeral being indicative that there can be a variable number of such blocks depending on the desired operations of the device. Connected to all of these circuits or blocks which constitute a source of data (such as $F_1$ and $F_2$) is destination bus 20. The latter may be a serial line or a plurality of parallel lines. Also included in the invention, and connected to all of these circuits or blocks (such as $F_1$ and $F_3$) which require that data be fed to them, is source bus 22. The latter may also be either a serial line or a plurality of parallel lines. Bus 20 is connected to receive data from circuits or devices operating as data sources and bus 22 is connected to provide data to those devices operating as data processors. Data modifier or transmission link 24 is connectable between bus 20 and bus 22 only in accordance with the functioning of link 23 as will be detailed hereinafter.

The system also includes means, such as program control device 26, for controlling the sequencing and functional relationship of all of the parts of the system. To this end, control device 26 is connected to both receive and provide data respectively from bus 22 and to bus 20, and also serves as a source of control signals sent out over control signal bus 30 to the other functional elements such as circuits $F_1$, $F_2$ and $F_3$, and to transmission link 24. For convenience in exposition, all data lines or buses will be shown as solid lines while all control signal lines or buses will be shown as dotted lines.

Figure 2:
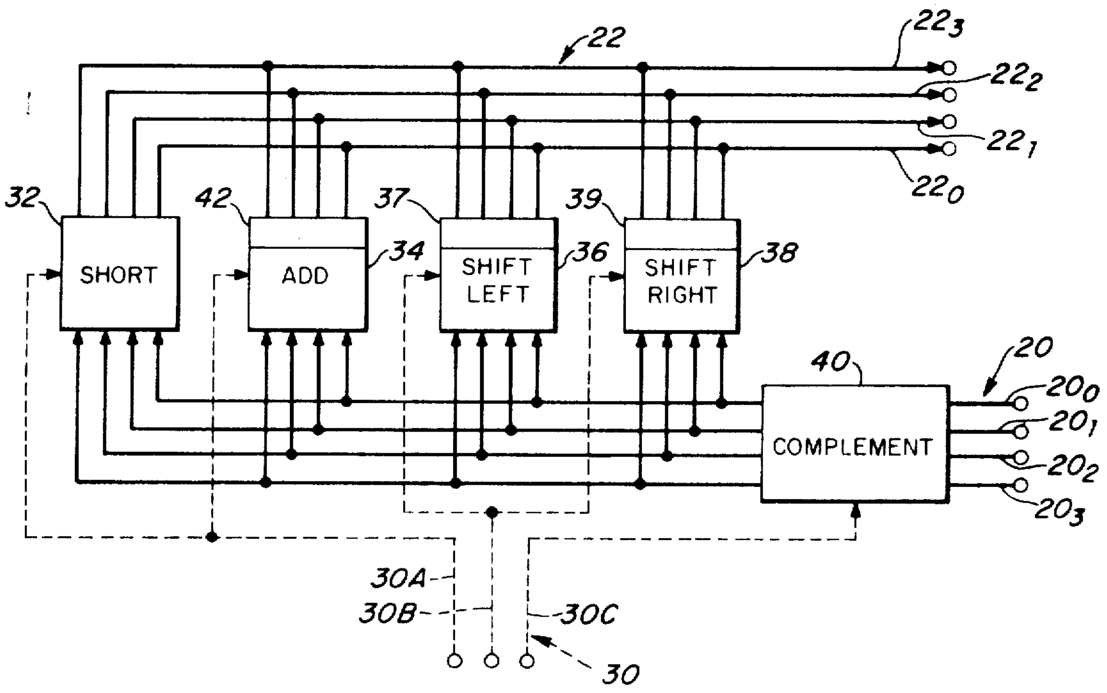
FIG. 2 is a block diagram showing details of an element of the embodiment of FIG. 1.

Referring now to FIG. 2 which shows transmission link 24 in more detail, it will be seen that the transmission link includes at least three basic single operand function devices all of which permit data which had been provided to the system by one of the functional devices, such as $F_1$, to become source data either for itself or for another of the functional devices. For the sake of clarity, data destination bus 20 is shown simplified as a four-line bus (although in the preferred embodiment, it is a 16-line bus). Each line of bus 20 is, for example, weighted in significance relative to the binary signal carried. Thus, bus 20 has lines $20_0$, $20_1$, $20_2$, $20_3$, and signals therein are weighted to have binary significance of $2^n$ where $n$ is the subscript numeral of the particular line. Data source bus 22 is also a four-line bus with lines $22_0$, $22_1$, $22_2$, and $22_3$ similarly weighted. Link 24 includes a first operand circuit or short-circuiting switch 32 which may be of any of a number of known switches which simply operate to join each line of bus 20 to the corresponding lines of bus 22 on command received over control line 30A of 30 from program control device 26, and without any change being made to the data transferred by the connection. In parallel to switch 32 is adder circuit 34, such as known half adder, which serves to add a unit or bit to the data incoming on bus 20 upon transfer of the data to source bus 22.

Thus, for example, if the state of bus 20 is such that lines $20_0$ and $20_2$ are energized and lines $20_1$ and $20_3$ are not energized, one can consider the bus to have the binary number 0101 (or decimal 5 thereon). Adder 34, when commanded by program control device 26 by signal over line 30A of bus 30, will then add binary 0001 thereto so that the output of adder 34 to bus 22 will then be 0110 (or decimal 6). Such adders are well known in the art and need no further description here. It will be appreciated that circuit 32 responds, for example, to a binary zero on line 30A while circuit 34 responds then only to a binary one as a control signal on line 30A.

Data link 24 also includes a pair of parallel shift circuits 36 and 38 connected between busses 20 and 22. Each is a single-bit shift register of known type, circuit 36 shifting left and circuit 38 shifting right. Thus, assuming the input to circuit 36 is binary 0101 as described above, on command received, for example as a binary one signal, over line 30 of bus 30, the output to bus 22 will be 1010. In this shift it will be seen that each digit is shifted to a more significant digit position. This shift is made with the MSD (most significant digit) being shifted into an associated one-bit register 37 and the bit previously stored in register 37 being shifted out to provide the LSD (least significant digit) of the binary output to bus 22. This shift through register 37 provides a one-bit delay in data shifting. Similarly, circuit 38, responsive then to a binary zero control signal over line $30_B$ of bus 30, will provide for an input of 0101, an output of 0010, the LSD being shifted to one-bit register 39 while the bit previously stored in the latter is sent to the MSD position.

In summation then, the data transmission link, depending on which of its operand function circuits is operating as determined by the program control device, will transmit data from the destination bus to the source bus by one of several paths: (1) unmodified or (2) incremented by one bit or (3) multiplied by the radix of the numerical code employed, i.e. shifted left one place shifted right one place depending on whether the multiple is greater or less than units. To provide yet additional capability, it is preferred that the input 9e.g., 20, before arriving at the alternative paths, be passed through complementing circuit 40 so that the input data to the various other circuits of data transmission link 24 can be either ones complemented or not complemented according to the binary state of a control signal on line 30C of bus 30. Thus, a two's complement capability exists simply by combining the one's complement capability of circuit 40 with the add "one" function of adder 34. Further, the output of adder 34 includes single-bit overflow register 42 so that, for example when the adder is full (e.g., in a 1111 state) the next bit added changes the state of the register to all zeros and the most significant bit ($1 \times 2^4$) then appears in overflow register 42. Examination of registers 37, 39 and 42 then indicates the state of the data passing through the respective single operand circuit associated with each register.

Figure 3:
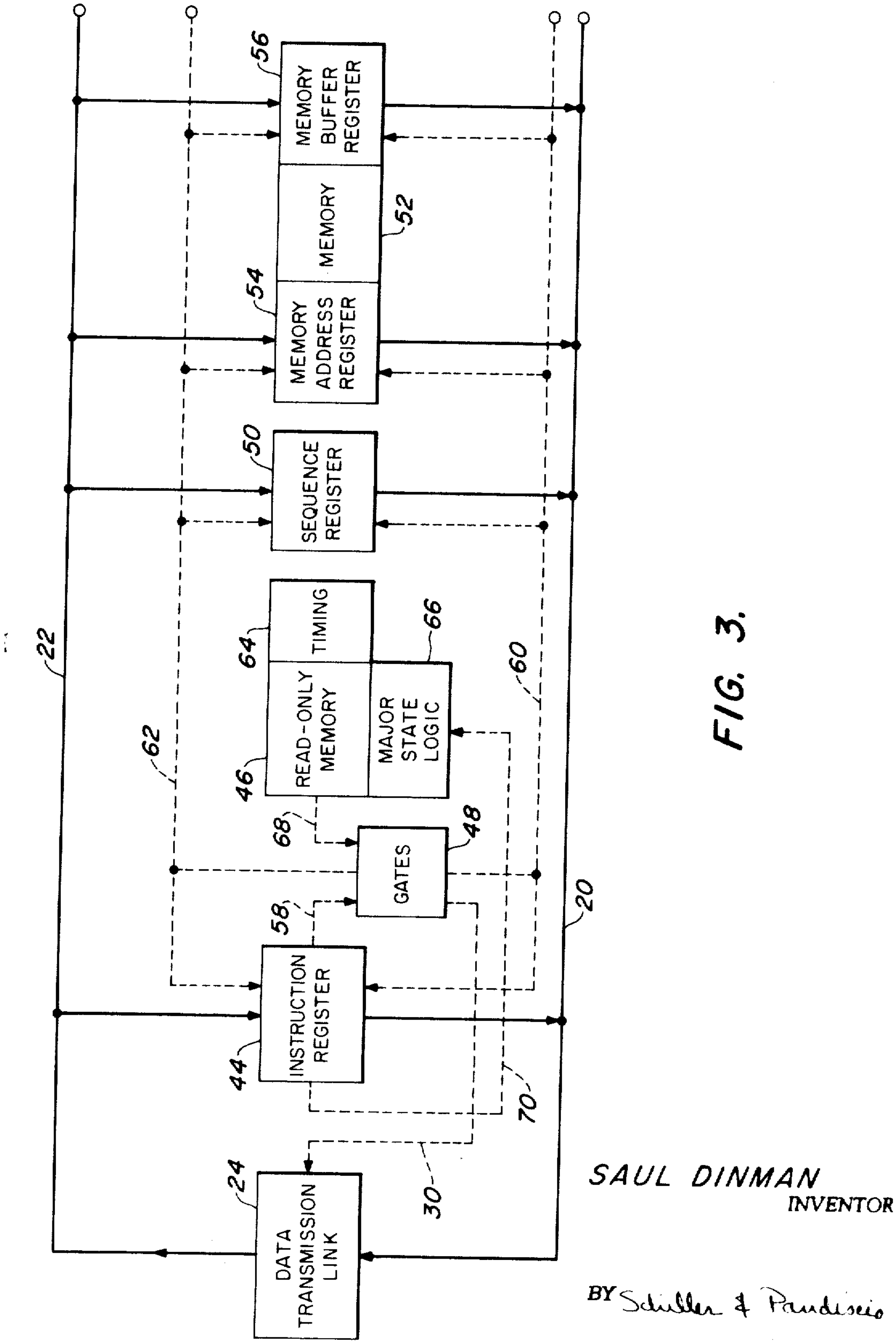
FIG. 3 is a block diagram showing details of other elements of the embodiment of FIG. 1.

The basic form of program control device 26, shown in more detail in FIG. 3 comprises instruction register 44, read-only memory 46, gating circuit 48 and sequence register 50. Shown associated with these latter for ease in describing the function of the system are data transmission link 24, data destination bus 20 and data source bus 22 and a functional device shown as a typical memory (such as a core, drum, tape memory or the like) 52 with an input memory address register 54 and an output memory buffer register 56. It will be appreciated that while not shown to avoid complicating the drawing, each block has associated therewith appropriate input and output address-decoding gates each set up to provide a unique identifying or address code for each block.

Instruction register 44 preferably has a 16-bit capacity and is connected between source bus 22 and destination bus 20 through appropriate addressed gates. The state of register 44 can be read out or examined on control line 58 which is fed into an input of gating circuit 48. The address gates of register 44 are connected to source address bus 60 and destination address bus 62, both of which are six-line buses for carrying control signals.

Sequence register 50 is another register connected across data buses 20 and 22 and need have a capacity only sufficient to store a single instruction address. The address gates at input and output of register 50 are also respectively connected to control signal buses 62 and 60. The output of gating circuit 48 is connected through a four-line signal bus 30 to data transmission link 44 as hereinbefore described.

The input and output gating of memory address register 54 and of memory buffer register 56 are also each connected across data buses 20 and 22 and their input and output gates are connected so as to be controlled by signal buses 62 and 60.

Lastly, read-only memory 46 has associated therewith timing circuit 64 and major state logic circuit 66. Timing circuit 64 typically includes the usual clock for providing sequential timing pulses, means for providing periodic data strobe signals timed by the pulses, and preferably a ring counter which sequences, responsively to the timing pulses, through four time intervals $T_0$, $T_1$, $T_2$, and $T_3$. Major state logic circuit 66 contains switching logic which will be described hereinafter for switching responsively to the selection of any of a number of major states in a sequence. The switching by circuit 66 occurs only once during each cycle of four successive time intervals switched through by the ring counter in timing circuit 64. The read-only memory therefore is a matrix switched by both circuits 64 and 66 so as to provide a predetermined 16-bit output control signal unique for each matrix selection made by circuits 64 and 66. Memory 46 is therefore preferably a hard-wired memory and its contents are relatively unchangeable. The output of memory 46 is also fed to an input of gating circuit 48 through control line 68. The logic circuit 66 is sequenced or programmed internally and also by signals on line 70 which describe the state of the instruction then in register 44.

Detailed understanding of the organization of the device can perhaps better be attained through a description of the operation of the system in an exemplary manner. To this end, one can assume that the memory 52 has stored therein a number of instruction words as well as a number of data words. Both types of words appear similar, being in the form of 16-bit words. The data words typically are organized to provide a first sign bit and then 15 information bits; the instruction words on the other hand are organized to provide first a six-bit destination address, four operation bits, and then six additional bits identifying the source address. Thus, it will be seen that every instruction in the machine reads substantially "transmit data from source A via path B to source C". The destination and source addresses, of course, are specific to the functional block so identified, and the path, which really requires but two bits to be properly specified, refers to which of the four alternative paths provided by the data transmission link will be employed. Only one bit is required to specify whether or not the data will be complemented when put through a specific path. Thus, the device uses instruction words in which, unlike conventional programming language, the word contains no implicit data paths, but instead all data interconnections are explicitly specified.

It can be further assumed that instruction register 44 contains an instruction word which is currently to be executed. Similarly, it can be assumed that sequence register contains the address of the next instruction to be executed.

In the preferred embodiment of the device, the read-only memory can be sequenced through a number of major states which typically include states as follows: fetch instruction (FI); fetch address (FA); fetch operand (FO); fetch deferred (FD); and a number of others which, for example will permit external control of the device or the like. Now assume that the major state logic has switched the matrix in the read-only memory to the FI state; during the duration of the latter the ring counter in timing circuit 64 then proceeds to cycle through the sequence of four time intervals $T_0$, $T_1$, $T_2$, and $T_3$. Typically, then while in the FI state during time interval $T_0$, read-only memory provides to gating circuit 48 the instruction word in which 07 is the address code for register 50 as the source, 0000 specifies the path through short circuit 32, and 05 specifies the memory address register as the destination. This instruction in essence simply requires the memory to prepare to take out of the latter the next instruction according to the address information which had been stored in sequence register 50. Now, at the end of time interval $T_0$, the ring counter switches the matrix and the 16-bit instruction for the $T_1$ interval during the FI state appears and typically translates to "take the information in the memory buffer register 56 and present it via short circuit 32 to the input of instruction register 44". When now the ring counter switches the matrix to time interval $T_2$, the read-only memory provides an execute signal whereby the previous two instructions presented to the inputs of the memory address register and the instruction register are entered. It will be recognized that these signals from the read-only memory appear simultaneously at the input of every device in the system, simply being a series of voltages set on the lines in buses 60 and 62, but which will have no effect except upon those elements which have been properly addressed by the previous instructions. The instruction register therefore now has a new instruction placed therein. As the ring counter switches to time interval $T_3$, the sequence register is updated by the resulting instruction from the read-only memory to take the contents of the sequence register, pass them through adder 34 to increase the number by one, and return it back to the sequence counter. Thus, during the FI state, the read-only memory provides addressing of the memory address register to seek out the next instruction, addressing of the memory buffer register to transfer the next instruction to the instruction register, and an execute command so that the previous two instructions are carried out. Finally, the sequence register is again updated to complete the cycle. It will be appreciated that the major state logic controls the sequencing of the major states in the read-only memory, and that for each major state, the read-only memory must read through four time slots before going to the next major state.

Often when a memory such as 52 requires a large content, a single instruction word cannot possibly contain an address which could reasonably be used to locate a word in the memory.

Consequently, when an instruction contains a memory address, such as 06, either as a destination or source address, the instruction will be recognized by control device 26 as being in a memory reference format. This indicates that the next immediately following word is not an instruction but may be a 16-bit address which is to be sent to the memory to identify the particular word to be taken from the memory. Alternatively, it may indicate that the next immediately following word is simply data, or is an address of an address or the like. To provide an indication of which memory reference format is to be used, an instruction containing a memory address may also have the last two of the middle four bits code the desired format to be followed, while of course, the first two of the middle four bits specifies the path chosen through the data transmission link. Thus, the FA or "fetch address" state can immediately follow the FI state previously described, so as to provide the instructions necessary to retrieve the desired word from the memory.

Similarly, the FO state is primarily employed to move a word from the memory buffer register to the memory address register. The FD state is employed to move words from the memory buffer register to the memory address register and then add one bit to the content of the memory buffer register. Other states can be provided to allow some outside agency coupled to the data line to take over the operation of the instruction register, to stop normal sequencing and permit emergency or asynchronous events to occur, such as the storage of randomly acquired data in the memory.

Fundamentally, programming the invention involves developing a list of instructions which are stored in memory 54 and retrieved as required by program control 26. Through the instrumentality of transmission link 24, however, the memory data can be modified as they are moved by the program control. The present invention therefore has an organization which permits the individual elements to be directly addressable so that the programmer can provide simple paths to each.

It will be apparent that the functional blocks $F_1$ etc., can be any of a large number of devices. For example, one of the blocks can be a data test circuit. The purpose of the latter would be to determine whether the value of the information it receives is less than, equal to, or more than 0, or combinations thereof. Such a tester would be connected between the source and destination buses and could accept data from any source. Similarly, one can employ arithmetic devices which perform specific arithmetic functions, can employ input devices, such as paper tape readers and the like, can employ output devices, such as paper tape punches, machine control circuits and the like. Such devices need only be added when and if desired, so that the system need have no superfluous functional parts.

Since certain changes may be made in the above apparatus without departing from the scope of the invention herein involved it is intended that all matter contained in the above description or shown in the accompanying drawings shall be interpreted in an illustrative and not in a limiting sense.

What is claimed is:

1. A system for digital, direct processing of data from data sources by data-processing elements comprising in combination;
   - a source bus for distributing data within said system to at least one of said processing elements;
   - a destination bus for distributing data within said system from at least one of said data sources;
   - a data transmission link for connecting said source and destination buses in a direction of data flow to source bus from destination in accordance only with a single operand function selected from a plurality of different operand functions;
   - program control means for providing controls signals for controlling the selection of operand function by said data transmission link, and the operation of said processing elements and data sources with respect to data flow in or out of said elements and sources, and
   - control signal bus means for distributing said control signals to and from any of said processing elements and said data sources connected to either a source or destination bus, and to said data transmission link.

2. A system as defined in claim 1 wherein said data transmission link included a plurality of devices each providing an alternative parallel path for data transmission, each device providing an operation on said data according to a respective one of said functions.

3. A system as defined in claim 2 wherein a first of said devices comprises means for adding one bit to said data passing through the path provided by said first device; a second of said devices provides a short circuit to permit transmission of data from said destination bus to said source bus unchanged; and a third of said devices comprises means for shifting the bits of said data so as to change the numerical significance thereof by a power of the radix of the numerical system of said data.

4. A system as defined in claim 1 wherein said data is expressed in a numerical code and said data transmission link is capable of providing at least three of said operand functions so as to transmit data through said link unmodified or incremented by one bit or multiplied by the radix of said numerical code.

5. A system as defined in claim 3 wherein said means for shifting include means for shifting said bits of data to positions of lesser numerical significance.

6. A system as defined in claim 3 wherein said means for shifting includes a single-bit register connected for storing the overflow bit from a shift and for providing said overflow bit to the next data shifted as the input bit therefor, so that a one-bit delay is introduced in the transmission of data shifted through said data transmission link.

7. A system as defined in claim 3 including a register connected for storing an overflow bit from said means for adding.

8. A system as defined in claim 3 wherein said means for shifting include means for shifting said bits of data to positions of greater numerical significance.

9. A system as defined in claim 1 including means for alternatively complementing or not complementing data before the latter are introduced into said data transmission link.

10. A system as defined in claim 1 wherein said program control means includes an instruction register for storing a current instruction word, a sequence register for storing at least the address of the next instruction word desired, and a read-only memory for providing a sequence of said control signals from storage for controlling the timing of transferring said instruction word for said instruction register to one of said data-processing elements and for updating said sequence register.

* * * * *